United States Patent [19]
Mouritzen et al.

[11] Patent Number: 5,492,453
[45] Date of Patent: Feb. 20, 1996

[54] MATERIALS HANDLING SYSTEM

[75] Inventors: Digby H. Mouritzen; Kenneth H. Mouritzen; Glenn L. Mouritzen, all of Durban, South Africa

[73] Assignee: Greystones Enterprises (Proprietary) Limited, Durban Natal Province, South Africa

[21] Appl. No.: 292,332

[22] Filed: Aug. 17, 1994

[30] Foreign Application Priority Data

Aug. 30, 1993 [ZA] South Africa ............... 93/6359

[51] Int. Cl.$^6$ .................................. B63B 27/00
[52] U.S. Cl. ................... 414/140.9; 414/139.4; 406/82
[58] Field of Search ............ 414/139.4, 140.7, 414/140.9; 406/10, 28, 29, 77, 82, 113, 114, 115; 198/575, 301, 303, 572, 573, 575, 577; 364/478; 340/676

[56] References Cited

U.S. PATENT DOCUMENTS

| | | | |
|---|---|---|---|
| 2,510,163 | 6/1950 | Wood | 198/79 |
| 3,198,353 | 8/1965 | McDowell | 414/140.9 |
| 3,231,064 | 1/1966 | Towels | 198/92 |
| 3,725,867 | 4/1973 | Jordan | 364/478 |
| 4,037,335 | 7/1977 | Sandberg | 406/115 |
| 4,475,848 | 10/1984 | Truninger | 406/115 |
| 4,609,309 | 9/1986 | Aralt | 406/115 |
| 4,659,262 | 4/1987 | Van Aalst | 406/29 |
| 5,293,986 | 3/1994 | Mouritzen et al. | 198/575 |

*Primary Examiner*—Frank E. Werner
*Assistant Examiner*—Douglas Hess
*Attorney, Agent, or Firm*—Killworth, Gottman, Hagan & Schaeff

[57] ABSTRACT

A materials handling system is disclosed which includes a pneumatic conveyor which feeds material onto a series of belt conveyors. The pneumatic conveyor includes a vertically movable nozzle for sucking up the material to be conveyed. Power is supplied to one of the belt conveyors from a power source and through that conveyor to the conveyors upstream of it. The pneumatic conveyor is connected to the first of the belt conveyors of the series so that it receives a signal indicating whether the first belt conveyor is powered. In the event that the signal received by the pneumatic conveyor indicates that the first belt conveyor is not powered, and the pneumatic conveyor is set for automatic operation, the nozzle is automatically lifted. Lifting continues for a predetermined period so that the nozzle is lifted clear of the material. Only when power is restored to the first belt conveyor, and this is signalled to the pneumatic conveyor, can the nozzle be lowered again.

7 Claims, 2 Drawing Sheets

MATERIALS HANDLING SYSTEM

FIELD OF THE INVENTION

This invention relates to a system for controlling the position of a suction nozzle which is used to draw flowable solid material, such as grain, from a container, such as a ship's hold.

BACKGROUND TO THE INVENTION

In the specification of our South African Patent No 92/9110 we disclose a conveyor system for transporting flowable solid material, such as grain, from a source, such as a ship's hold, to a storage silo, a warehouse or the like. A feature of the conveyor system is that, in the event of a breakdown or an emergency situation, the conveyor involved is shut down together with all those upstream of it. If the first conveyor of the series onto which the solid material is initially dumped stops then the equipment which is dumping the solid material onto that conveyor should also stop. This equipment, to ensure continuous flow of solid material onto the first conveyor rather than intermittent flow, is usually a suction unit. This comprises a suction nozzle having a bottom inlet and a discharge outlet onto the first conveyor of the series. Raising and lowering means are provided for the nozzle so that it can be lowered into the hold, immersed in the material and then lifted from the empty hold.

BRIEF SUMMARY OF THE INVENTION

According to the present invention there is provided a materials handling system including a series of conveyors each including a belt, a pneumatic conveyor having a suction nozzle and a material outlet from which material is discharged onto a first belt conveyor of said series, and control means for said suction nozzle of said pneumatic conveyor, the control means comprising power detecting means for detecting power at a power outlet of said first belt conveyor of said series of belt conveyors, first nozzle actuating means which when operated displaces said nozzle in an upward direction, second nozzle actuating means which when operated displaces said nozzle in a downward direction, and disabling means operated by said power detecting means which disables said second nozzle actuating means when it detects that power supply to said power outlet has terminated and which further supplies power to said first nozzle actuating means so that said nozzle is displaced upwardly.

The system can further include a timer for causing supply of power to said first nozzle actuating means for a predetermined time period after the detecting means has detected termination of the power supply to said power outlet. In the form of the invention which includes the timer the disabling means can comprise a relay which is energised from a power line whilst power is detected by said power detecting means, said relay having a first set of normally open contacts connected between said power line and said first nozzle actuating means, a second set of normally closed contacts for permitting power to be supplied to said second nozzle actuating means, and a third set of normally open contacts connected between said power line and said timer, said first, second and third sets of contacts switching over to closed, open and closed respectively upon said relay being de-energised.

To provide for both manual and automatic control the system can include switch means for switching the control system between a manual condition in which said first and second nozzle actuating means can be supplied with power whether said power detecting means is or is not detecting power and an automatic condition in which power supply to said nozzle actuating means is under the control of said power detecting means.

The switch means can control energisation and deenergisation of two further relays, the further relays being in parallel with one another and in series with said switch means, said switch means having a manual position in which a first of said two further relays is energised and a second of said two further relays de-energised and an automatic position in which said first of said further relays is deenergised and said second of said further relays is energised, said first of said further relays having contacts which are closed whilst said first of said further relays is energised and which by-pass said means for detecting power so that supply of power to said first and second nozzle actuating means is possible whether or not the first mentioned relay is energised, said second of said further relays including contacts which are closed whilst the second of said further relays is energised and which connect said power line to a source of power, the contacts of the first of said further relays opening and the contacts of the second of said further relays closing as said switch means is moved from said manual position to said automatic position.

In one constructional form said timer controls a set of normally closed contacts which open a predetermined time after the power detecting means detected termination of the power supply, the contacts controlled by the timer being in series with the normally open contacts of the first mentioned relay. In this form it is preferred that said first of the further relays controls a set of contacts which are open whilst the first of the further relays is energised and closed whilst the first of the further relays is deenergised, these contacts being in series with the contacts controlled by the timer and with the normally open contacts of the first mentioned relay.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
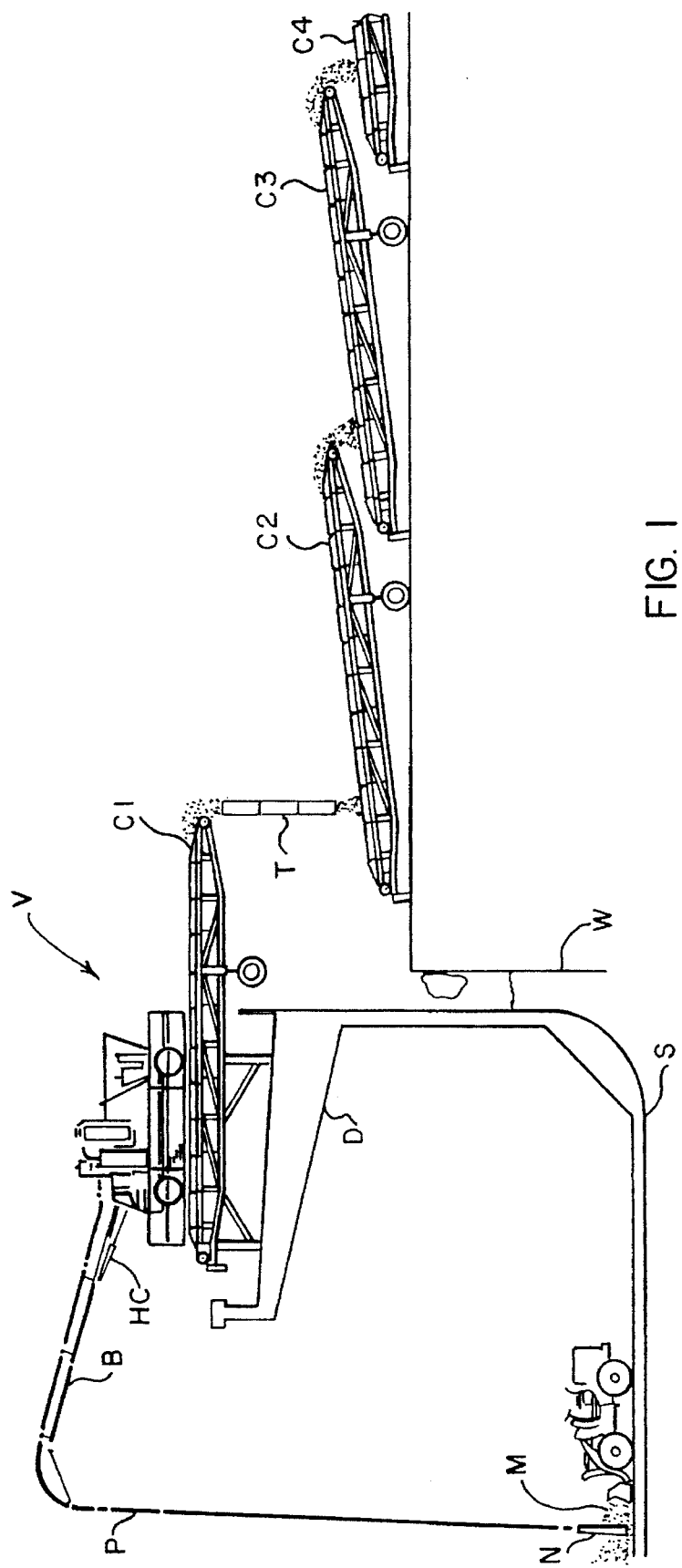
FIG. 1 diagrammatically illustrates a materials conveying system.

The materials conveying system shown in FIG. 1 is illustrated unloading flowable material M from the hold of a ship S. A piece of equipment commonly referred to in the art as a "Vac-U-Vator" V stands on a first conveyor C1 which itself stands on the deck D of the ship S.

A boom B extends from the "Vac-U-Vator" V to a position over the ship's hold. The boom B supports a nozzle N. A pipe P leads from the nozzle N to the "Vac-U-Vator" V. The pipe P dumps material onto the belt of the conveyor C1. The boom B is lifted and lowered by means of an hydraulic cylinder HC. The cylinder HC constitutes nozzle raising and lowering means.

A conveyor, which may be up to ten conveyors from the conveyor C1, receives power from a power supply. All the remaining conveyors back to the conveyor C1 are fed through the other conveyors. Thus C4 feeds C3, C3 feeds C2 and C2 feeds C1.

The conveyor C1 feeds the material M across the gap between the ship S and the wharf W. The material falls from the conveyor C1 down a tube T onto a further conveyor C2. The conveyor C1 is the first of a series of conveyors C1, C2, C3, C4 etc.

Figure 2:
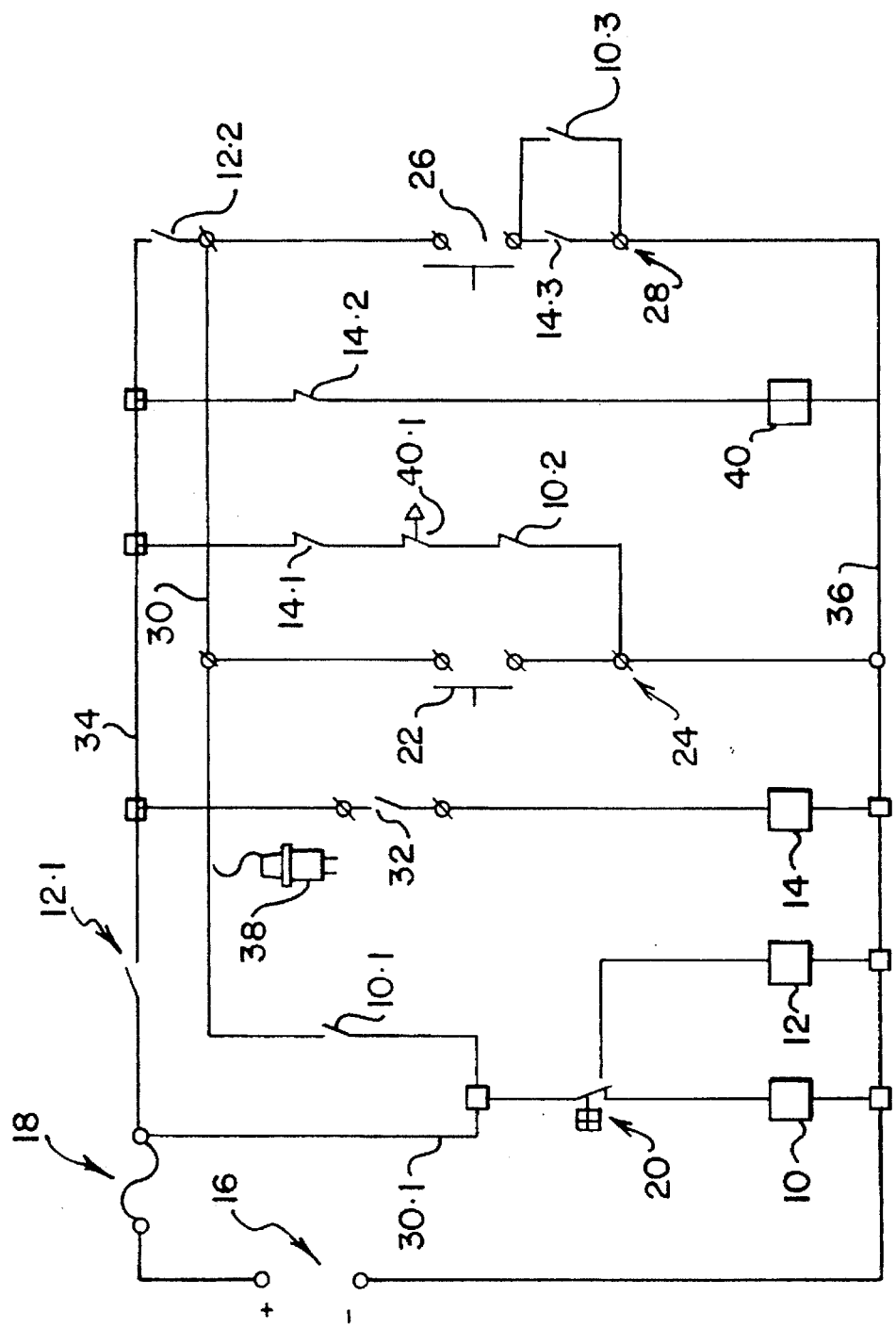
FIG. 2 is a circuit diagram of a control system for the raising and lowering means of a suction nozzle forming part of the system of FIG. 1.

The circuit illustrated in FIG. 2 includes three relays 10, 12 and 14 which are connected across a twelve volt DC power source 16. The circuit is protected by an overload fuse or breaker 18. The contacts of the relay 10 are designated 10.1, 10.2 and 10.3, the contacts of the relay 12 are designated 12.1 and 12.2 and the contacts of the relay 14 are designated 14.1, 14.2 and 14.3.

The relays 10 and 12 are in series with a manually operable switch 20. The button which controls "up" movement of the nozzle's drive mechanism is designated 22 and is connected to a solenoid 24. The button which controls "down" movement is designated 26 and is connected to a solenoid 28. The solenoids control hydraulic circuits. The solenoids 24 and 28 are connected, when the buttons 22 and 26 respectively are depressed, to a feed line 30.

When the switch 20 is in one position the relay 10 is energised, the contacts 10.1 and 10.3 are closed and the contacts 10.2 are open. The contacts 10.1 when closed effectively bridge out the remainder of the circuit as they connect the feed line 30, and hence the buttons 22 and 26 and the solenoids 24 and 28, directly to the power line designated 30.1. Thus regardless of the state of the relays 12 and 14, the "up" and "down" solenoids 24 and 28 can be energised by pressing the buttons 22 and 26.

A set of contacts 32 is connected in series with the relay 14 between a further power line 34 and a return line 36. The contacts 32 are closed whilst a link-over cable 38, which is connected to the power output of the first conveyor C1 of the series, detects power at the power output of the first conveyor C1. The presence of power indicates that the first conveyor C1 is running. The relay 14 is thus energised at this time. The contacts 14.1 and 14.2 are open and the contacts 14.3 closed.

The contacts 12.1 isolate the line 34 from the power supply 16 and contacts 12.2 isolate the line 34 from the feed line 30. Thus even when contacts 10.1 are closed, no power can reach the line 34 from the line 30.

When the switch 20 is set to automatic, the relay 10 is de-energised and the relay 12 energised. The contacts 10.1 and 10.3 open and contacts 10.2 close. The contacts 12.1, 12.2 close. If the contacts 32 detect power at the first conveyor C1, the relay 14 is energised. The contacts 14.1 and 14.2 are open and the contacts 14.3 are closed.

In this condition, when the "down" button 26 is depressed, power is supplied through the contacts 12.1, 12.2 and 14.3 to the solenoid 28. When the "up" button 22 is depressed, power is supplied through the contacts 12.1 and 12.2. Thus the buttons can be used to supply hydraulic fluid to one of other end of the cylinder HC and thus raise and lower the boom B and hence the nozzle N.

A timer 40 is connected between the power line 34 and the return line 36, normally closed contacts 40.1 of the timer being between the solenoid 24 and the line 34. The contacts 40.1 are thus in series with the contacts 14.1 and 10.2.

If power to the first conveyor C1 is interrupted, power supply to the power outlet of the first conveyor is interrupted and this is detected by the link over cable 38. The relay 14 is de-energised opening the contacts 14,3 and closing the contacts 14.1 and 14.2. The down button 26 is thus disabled as the contacts 10.3 and 14.3 are both open. When the contacts 14.1 close, the circuit to the solenoid 24 is completed because the contacts 40.1 are normally closed and the contacts 10.2 closed when the system was switched from manual control to automatic control. Closure of the contacts 14.2 starts the timer 40 and after a predetermined delay of, for example, ten seconds, the contacts 40.1 open. The result is that solenoid 24 is automatically supplied with power through the contacts 14.1, 40.1 and 10.2 from the line 34 for a predetermined period and the hydraulic cylinder HC is supplied with hydraulic fluid. The boom B is lifted and the nozzle N is thus automatically displaced upwardly out of the mass of solid material M thereby interrupting supply of material to the first conveyor C1. After the delay period controlled by the timer 40, the contacts 40.1 open and upward movement of the nozzle N ceases.

The nozzle N can only be lowered by use of the button 26 when the relay 14 is energised upon power supply to the first conveyor C1 being re-established. Pressing the button 26 causes hydraulic fluid to be supplied to the upper end of the cylinder HC. The relay 12, having remained energised, resumes control of the system.

We claim:

1. A materials handling system including a series of belt conveyors each including a belt, a pneumatic conveyor having a suction nozzle and a material outlet from which material is discharged onto the belt of a first belt conveyor of said series, said first belt conveyor having an electrical outlet at which there is a signal indicating when power is being supplied to said first belt conveyor and control means for said suction nozzle of said pneumatic conveyor, the control means comprising detecting means for detecting said signal at said outlet of said first belt conveyor of said series of belt conveyors, first nozzle actuating means which when operated displaces said nozzle in an upward direction, second nozzle actuating means which when operated displaces said nozzle in a downward direction, and disabling means operated by said signal detecting means which disables said second nozzle actuating means when it detects that power supply to said first belt conveyor has terminated and which further supplies power to said first nozzle actuating means so that said nozzle is displaced upwardly.

2. A materials handling system according to claim 1, and which includes a timer for causing supply of power to said first nozzle actuating means for a predetermined time period after the detecting means has detected termination of the supply to said power outlet.

3. A material handling system according to claim 2, and including a power line, said second nozzle actuating means operated by said disabling means comprising a relay which is energised from said power line whilst power is detected by said detecting means, said relay having a first set of normally open contacts connected between said power line and said first nozzle actuating means, a second set of normally closed contacts for permitting power to be supplied to said second nozzle actuating means, and a third set of normally open contacts connected between said power line and said timer, said first, second and third sets of contacts switching over to closed, open and closed respectively upon said relay being de-energised.

4. A materials handling system according to claim 3, and including switch means for switching the control system between a manual condition in which said first and second nozzle actuating means can be supplied with power whether said detecting means is or is not detecting power and an automatic condition in which power supply to said nozzle actuating means is under the control of said detecting means.

5. A materials handling system according to claim 4, and including two further relays, the further relays being in parallel with one another and in series with said switch means, said switch means having a manual position in which a first of said two further relays is energised and a second of said two further relays de-energised and an automatic position in which said first of said further relays is deenergised and said second of said further relays is energised, said first of said further relays having contacts which are closed whilst said first of said further relays is energised and which by-pass said detecting means so that supply of power to said first and second nozzle actuating means is possible whether or not the first mentioned relay is energised, said second of said further relays including contacts which are closed whilst the second of said further relays is energised and which connect said power line to a source of power, the contacts of the first of said further relays opening and the contacts of the second of said further relays closing as said switch means is moved from said manual position to said automatic position.

6. A materials handling system according to claim 5, in which said timer controls a set of normally closed contacts which open a predetermined time after the detecting means detected termination of the power supply, the contacts controlled by the timer being in series with the normally open contacts of the first mentioned relay.

7. A materials handling system according to claim 6, in which said first of the further relays controls a set of contacts which are open whilst the first of the further relays is energised and closed whilst the first of the further relays is deenergised, these contacts being in series with the contacts controlled by the timer and with the normally open contacts of the first mentioned relay.

* * * * *